US012560700B2

(12) United States Patent　　　　(10) Patent No.:　US 12,560,700 B2

Buechler et al.　　　　　　　　　　(45) Date of Patent:　Feb. 24, 2026

(54) METHOD AND DEVICE FOR DETERMINING AT LEAST ONE ARTICULATION ANGLE OF A VEHICLE COMBINATION

(71) Applicant: Robert Bosch GmbH, Stuttgart (DE)

(72) Inventors: Kai Buechler, Heilbronn (DE); Matthias Eix, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 330 days.

(21) Appl. No.: 17/787,763

(22) PCT Filed: Dec. 16, 2020

(86) PCT No.: PCT/EP2020/086391
§ 371 (c)(1),
(2) Date: Jun. 21, 2022

(87) PCT Pub. No.: WO2021/130074
PCT Pub. Date: Jul. 1, 2021

(65) Prior Publication Data

US 2023/0032839 A1　　Feb. 2, 2023

(30) Foreign Application Priority Data

Dec. 23, 2019　(DE) ..................... 10 2019 220 526.7

(51) Int. Cl.
*G01S 13/88*　　　(2006.01)
*B60D 1/58*　　　(2006.01)

(52) U.S. Cl.
CPC ................ *G01S 13/88* (2013.01); *B60D 1/58* (2013.01)

(58) Field of Classification Search
None
See application file for complete search history.

(56) References Cited

U.S. PATENT DOCUMENTS

2016/0153778 A1　6/2016　Singh et al.

FOREIGN PATENT DOCUMENTS

DE　　　　10325192 A1　1/2005
DE　　102004059596 A1 * 6/2006 ............... B60D 1/36
(Continued)

OTHER PUBLICATIONS

Chen et al., "Micro-Doppler Effect in Radar: Phenomenon, Model, and Simulation Study", Transactions on Aerospace and Electronic Systems (vol. 42, Issue: 1, 2006, pp. 2-21). (Year: 2006).*

(Continued)

*Primary Examiner* — Robert W Hodge
*Assistant Examiner* — Brandon James Henson
(74) *Attorney, Agent, or Firm* — NORTON ROSE FULBRIGHT US LLP

(57) ABSTRACT

A method for determining at least one articulation angle of a vehicle combination. The method includes: ascertaining of radar data by at least one radar sensor situated on a vehicle of the vehicle combination; calculating, on the basis of the ascertained radar data, at least one item of position information that relates to a vehicle position of at least one additional vehicle of the vehicle combination; and calculation of the at least one articulation angle between the vehicle and the at least one additional vehicle of the vehicle combination, using the calculated position information.

9 Claims, 3 Drawing Sheets

(56) References Cited

FOREIGN PATENT DOCUMENTS

| | | | | |
|---|---|---|---|---|
| DE | 102008037233 A1 | | 3/2010 | |
| DE | 102010006521 A1 | | 9/2010 | |
| DE | 102017125662 A1 | * | 5/2018 | ............ B60D 1/245 |
| EP | 3553551 A1 | * | 10/2019 | ............ G01S 13/50 |
| KR | 20190060574 A | | 6/2019 | |
| WO | WO-2020207572 A1 | * | 10/2020 | ............ B60T 8/1708 |

OTHER PUBLICATIONS

International Search Report for PCT/EP2020/086391, Issued Apr. 15, 2021.
Chen et al., "Micro-Doppler Effect in Radar: Phenomenon, Model, and Simulation Study," IEEE Transactions on Aerospace and Electronic Systems, vol. 42, No. 1, 2006, pp. 1-20. <https://www.researchgate.net/publication/3003947_Micro-Doppler_Effect_in_Radar_Phenomenon_Model_and_Simulation_Study> Downloaded Jun. 21, 2022.

* cited by examiner

METHOD AND DEVICE FOR DETERMINING AT LEAST ONE ARTICULATION ANGLE OF A VEHICLE COMBINATION

FIELD

The present invention relates to a method for determining at least one articulation angle of a vehicle combination, and to a device for determining at least one articulation angle of a vehicle combination.

BACKGROUND INFORMATION

Driver assistance systems for vehicle combinations require information about the position of the trailing vehicle relative to the towing vehicle. This information can be evaluated in order to, for example, increase the usefulness of functions, with a focus on a lateral region alongside the towing vehicle, for example for monitoring dead angles. Other functions, such as a maneuvering assistant, may first be made possible by such information.

The articulation angle between the towing vehicle and the trailer, or more generally between two vehicles of the vehicle combination, is important. This can be acquired for a semi-trailer having a sensory system in the coupling. For a plurality of rotation points, for example given pivot plate trailers or a plurality of trailers, such a sensor system is however not possible, or is possible only with an excessively high outlay.

A contactless scanning of the environment, and thus of the trailer, is advantageous. In German Patent Application No. DE 10 2010/006521 A1, a method is described for determining at least one articulation angle of a vehicle combination, in which an imaging sensor is used to scan a vehicle surrounding environment, and in which the articulation angle is determined by measured flux vectors.

SUMMARY

The present invention presents a method for determining at least one articulation angle of a vehicle combination, and a device for determining at least one articulation angle of a vehicle combination.

Preferred specific embodiments of the present invention are disclosed herein.

According to a first aspect, the present invention accordingly relates to a method for determining at least one articulation angle of a vehicle combination. In accordance with an example embodiment of the present invention, radar data are ascertained by at least one radar sensor situated on a vehicle of the vehicle combination. At least one item of position information is calculated on the basis of the ascertained radar data, which information relates to a vehicle position of at least one additional vehicle of the vehicle combination. The at least one articulation angle between the vehicle having the at least one radar sensor and the at least one additional vehicle of the vehicle combination is calculated using the calculated position information.

The present invention enables a contactless ascertaining of the at least one articulation angle of the vehicle combination. Compared to imaging methods, such as video cameras, the measurement design of the radar sensor is typically independent of illumination and weather influences, so that a very high degree of availability can be ensured.

Differing from mechanical sensors, for example in the semi-trailer coupling, the radar sensor is also exposed to essentially no wear.

Finally, radar sensors are typically already installed in modern vehicles in order to provide various functionalities for driver support, so that no additional components are required to determine the at least one articulation angle of the vehicle combination.

According to a further specific embodiment of the present invention of the method for determining at least one articulation angle of the vehicle combination, the calculation of the at least one item of position information includes the determining of an item of micro-Doppler information based on the ascertained radar data, a position and/or number of wheels of the at least one additional vehicle being ascertained on the basis of the micro-Doppler information. Based on the rotation of the rims, regions of the rims moved towards the radar sensor and other regions move away from the radar sensor. This typical speed distribution can be recognized on the basis of the micro-Doppler effect, so that the position of the wheels can be determined precisely. The information relating to the position and/or number of wheels, or axes, of the at least one additional vehicle can be used for the recognition of the type of trailer, and further increases the accuracy of the ascertained articulation angle. The micro-Doppler effect for radar data or radar signals is described, for example, in the paper by Victor Chen et al.: "Micro-Doppler Effect in Radar: Phenomenon, Model, and Simulation Study," in: IEEE Transactions on Aerospace and Electronic Systems, vol. 42, no. 1, January 2006.

According to a further specific embodiment of the present invention of the method for determining at least one articulation angle of the vehicle combination, on the basis of a vehicle combination model the at least one articulation angle is estimated, and the at least one articulation angle calculated on the basis of the radar data is corrected using the at least one articulation angle estimated on the basis of the vehicle combination model. Here, statistical methods can be used. In particular, the measurement accuracy of the radar data can be taken into account in order to calculate a degree of accuracy of the at least one articulation angle calculated on the basis of the radar data. In addition, a degree of accuracy of the articulation angle calculated on the basis of a vehicle combination model can be taken into account. In particular, the accuracy of vehicle combination models that describe a kinematic behavior of the trailer is greater than for models that do not describe this kinematic behavior.

According to a further specific embodiment of the present invention of the method for determining at least one articulation angle of the vehicle combination, an assignment of the ascertained radar data to the at least one additional vehicle of the vehicle combination is made using the at least one articulation angle estimated on the basis of the vehicle combination model. On the basis of the estimated at least one articulation angle, the position or orientation to be expected of the at least one additional vehicle can be specified, making it easier to distinguish between radar data that are to be assigned to the at least one additional vehicle of the vehicle combination and radar data that originate from other objects in the vehicle environment.

According to a further specific embodiment of the present invention of the method for determining at least one articulation angle of the vehicle combination, the at least one articulation angle is estimated using an item of driving information of the vehicle on which the radar sensor is situated. The driving information can be at least one of: an instantaneous speed, an instantaneous yaw rate, an instantaneous steering angle, and a general vehicle parameter of the vehicle on which the radar sensor is situated.

According to a further specific embodiment of the present invention of the method for determining at least one articulation angle of the vehicle combination, the estimation of the at least one articulation angle is carried out for a multiplicity of vehicle combination models, a vehicle combination model that best describes the vehicle combination being selected from the multiplicity of vehicle combination models on the basis of a comparison of the at least one articulation angle estimated on the basis of the multiplicity of vehicle combination models with the at least one articulation angle calculated on the basis of the radar data. The various vehicle combination models may differ in, for example, the number and position of the axes, the length of the at least one additional vehicle of the vehicle combination.

According to a further specific embodiment of the present invention of the method, a driver can manually select the type of the at least one additional vehicle of the vehicle combination. A corresponding vehicle combination model is then used as the basis for the further evaluation of the radar data.

According to a further specific embodiment of the present invention of the method for determining at least one articulation angle of the vehicle combination, on the basis of the calculated position information at least one of the following is in addition calculated:

an axial position of axes of the at least one additional vehicle of the vehicle combination;

a length of the at least one additional vehicle of the vehicle combination; and a type of the at least one additional vehicle of the vehicle combination.

The recognition of the type of the at least one additional vehicle of the vehicle combination is advantageous because different trailers can differ in their kinematic behavior. In this way, a more accurate solution can be provided that is robust under various environmental influences. In particular, on the basis of the type of the at least one additional vehicle the assignment of radar data to the at least one additional vehicle can be improved, because the predicted position of the at least one additional vehicle can be better estimated on the basis of the recognized kinematic behavior of the at least one additional vehicle. In particular in the case of retrofitted driver assistance systems, the type of the at least one additional vehicle is usually not known, so that the automatic determination based on the radar data is advantageous.

According to a further specific embodiment of the present invention of the method for determining at least one articulation angle of the vehicle combination, the type of the at least one additional vehicle of the vehicle combination is calculated on the basis of one or more axial positions and/or the length of the at least one additional vehicle of the vehicle combination.

According to a further specific embodiment of the present invention of the method for determining at least one articulation angle of the vehicle combination, the at least one radar sensor is situated on a towing vehicle of the vehicle combination. However, the radar sensor can also be integrated in one of the trailers.

The numbering of method steps is done for ease of comprehension, and is not generally intended to imply any particular temporal sequence. In particular, a plurality of method steps can also be carried out simultaneously.

DETAILED DESCRIPTION OF EXAMPLE EMBODIMENTS

Figure 1:
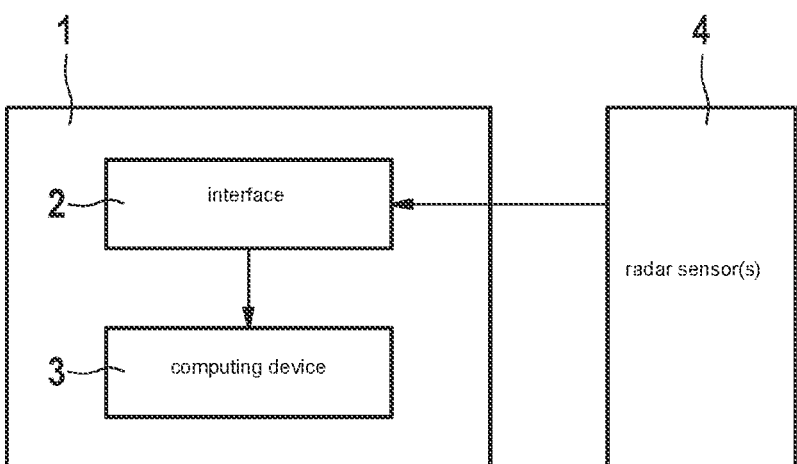
FIG. 1 shows a schematic diagram of a device for determining at least one articulation angle of a vehicle combination according to a specific example embodiment of the present invention.

FIG. 1 shows a schematic diagram of a device 1 for determining at least one articulation angle of the vehicle combination. Device 1 includes an interface 2 that is coupled to one or more radar sensors 4, for example by a cable connection or a contactless connection. Via interface 2, device 1 receives radar data from the at least one radar sensor 4. Radar sensor 4 is situated on a vehicle of the vehicle combination, preferably on a towing vehicle. Device 1 can be integrated in the radar sensor or can be part of a driver assistance system. In particular, device 1 can also be situated in the vehicle in which the at least one radar sensor 4 is situated, i.e. preferably in the towing vehicle.

The vehicle combination can be a tractor-trailer, i.e. a truck with a trailer, a semi truck and semi-trailer, a bus combination, i.e. a combination of a bus and bus trailer, a tour trolley, i.e. a combination of a towing vehicle and towed passenger wagons, a camping trailer combination, i.e. a towing vehicle and a camping trailer, a motorcycle combination, i.e. a motorcycle with a trailer, a towing vehicle with a wagon, and the like, The present invention is not limited to a vehicle combination having a particular number of vehicles, but in particular is applicable for any number of trailers.

The received radar data are provided to a computing device 3 of device 1. Computing device 3 includes at least one processor, microprocessor, integrated circuit, or the like. In addition, computing device 3 includes a memory for storing the received radar data.

On the basis of the radar data ascertained by the at least one radar sensor 4, computing device 3 calculates at least one item of position information relating to a vehicle position of at least one additional vehicle of the vehicle combination, i.e. preferably of a trailer. In particular, the position information can include information relating to at least a part of a contour and/or of a position of wheels of the at least one additional vehicle.

On the basis of the calculated position information, computing device 3 calculates an articulation angle between the vehicle having the radar sensor and the at least one additional vehicle of the vehicle combination. If the vehicle combination includes more than two vehicles, a corresponding multiplicity of articulation angles can be calculated by computing device 3.

Figure 2:
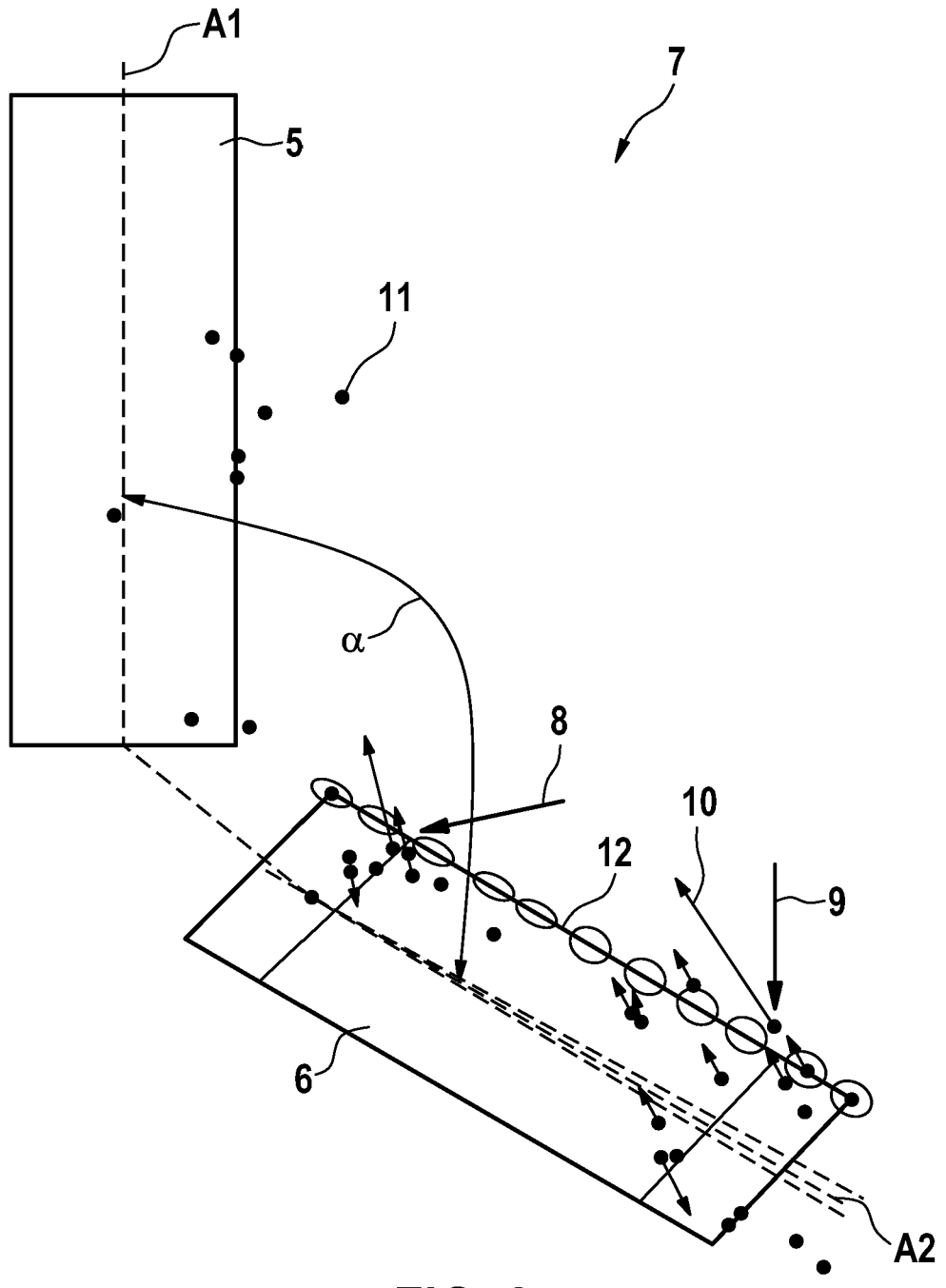
FIG. 2 shows a schematic representation of radar reflections and positions of a towing vehicle and of a trailer.

FIG. 2 shows a schematic representation of radar reflections and positions of a towing vehicle 5 and of a trailer 6, which form a vehicle combination 7. The radar data include a multiplicity of reflection points 11 that originate at least in part from trailer 6. By ascertaining items of micro-Doppler information, positions 8, 9 of rims of wheels of trailer 6 can be ascertained by evaluating items of speed information 10. On the basis of the radar data, an item of position information relating to trailer 6 can be ascertained. In particular, a contour line 12 can be calculated. Contour line 12 runs parallel to an axis A2 of trailer 6. Articulation angle α is calculated as an angle between calculated contour line 12, or axis A2, of trailer 6 and an axis A1 of towing vehicle 5.

Figure 3:
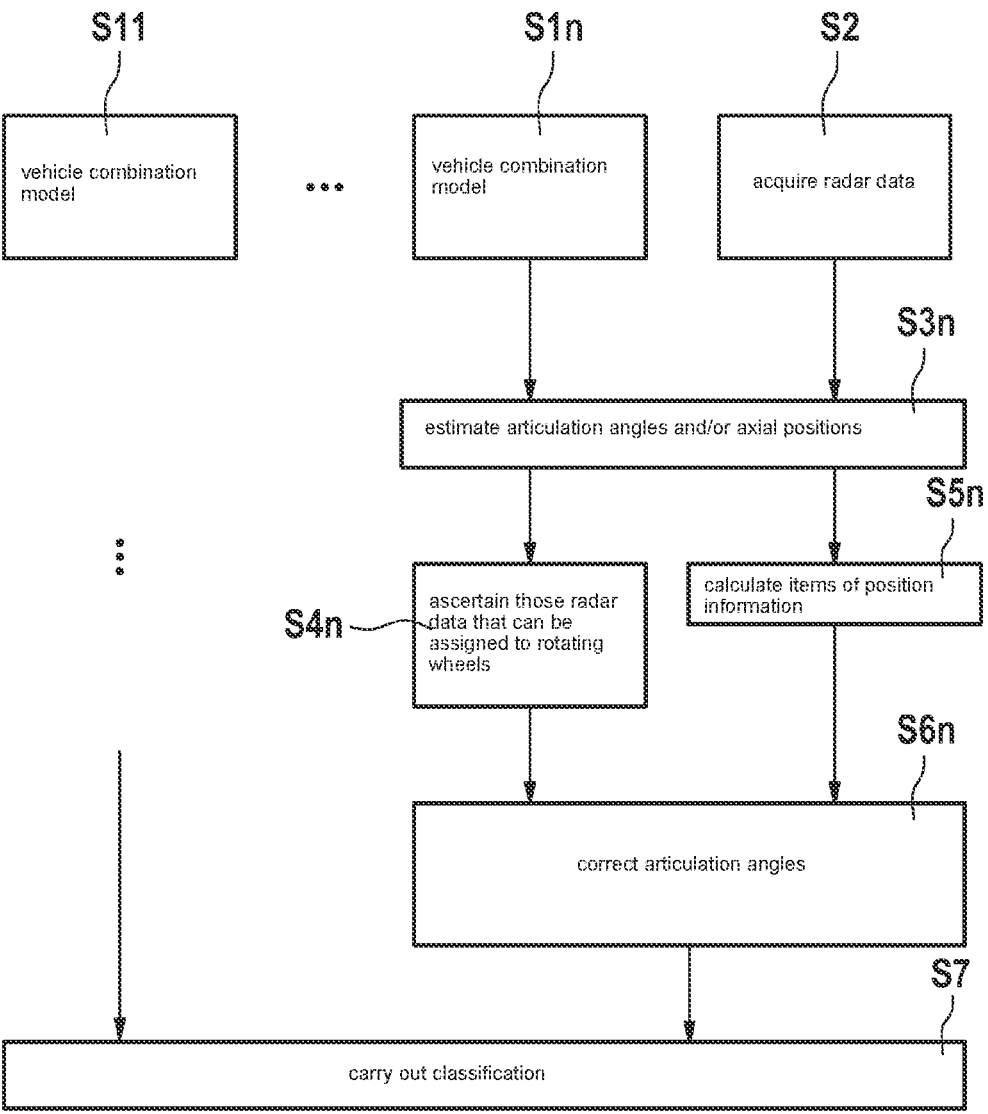
FIG. 3 shows a schematic flow diagram of a method for determining at least one articulation angle of a vehicle combination according to a specific example embodiment of the present invention.

FIG. 3 shows a schematic flow diagram of a method for determining at least one articulation angle of a vehicle combination.

In a first method step, n vehicle combination models are provided, S11 through Sn, where n is any natural number greater than 1. The vehicle combination models can differ from one another in the type of the model vehicle combination, in particular in the dimensions of the vehicles, and/or in the number of axes of the vehicles.

In a further method step S2, radar data are acquired by a radar sensor 4 situated on a vehicle 5 of the vehicle combination.

In a further method step S3n, for each vehicle combination model articulation angles and/or axial positions of at least one additional vehicle of the vehicle combination, preferably of a trailer, are estimated. On the basis of the radar data, in this method step the location and speed of reflecting objects in the environment of the vehicle combination are determined. On the basis of the estimated articulation angle and/or the estimated axial position, those radar data are selected that are to be assigned to the at least one additional vehicle of the vehicle combination. In this way, an assignment of the radar data to the trailer takes place.

In a further method step S4n, for each vehicle combination model those radar data are ascertained that, using the Doppler speed, can be assigned to the rotating wheels and thus to the axes of the at least one additional vehicle. In this way, items of micro-Doppler information are ascertained.

In a further method step Syn, for each vehicle combination model items of position information are calculated, in particular contours of the at least one additional vehicle. The at least one articulation angle is calculated on the basis of the calculated position information.

In a further method step S6n, for each vehicle combination model the at least one articulation angle calculated on the basis of the radar data is corrected using the at least one articulation angle estimated on the basis of the vehicle combination model.

In a method step S7, a classification is carried out. For this purpose, errors between radar-based articulation angles and model-based articulation angles are used. Through comparison, from the multiplicity of vehicle combination models the vehicle combination model is selected that best describes the vehicle combination. This is done taking into account that different trailer types move differently due to the different kinematic behavior, which is reflected in the different vehicle combination models. Correspondingly, the error of a vehicle combination model that describes the kinematic behavior of the actual trailer is in general smaller than for a vehicle combination model that does not take this kinematic behavior into account. In addition, the information about the wheel positions, and thus axial positions, and in particular the recognized number of axes of the at least one additional vehicle can be evaluated so that the trailer types can be unambiguously distinguished in many cases.

During driving operation, steps S2 through S6n are repeated, using the selected vehicle combination model.

What is claimed is:

1. A method for determining at least one articulation angle of a vehicle combination, the method comprising:
   ascertaining radar data by at least one radar sensor situated on a vehicle of the vehicle combination;
   calculating, based on the ascertained radar data, at least one item of position-information that relates to a vehicle position of at least one additional vehicle of the vehicle combination, the at least one item of position information including a contour line of the at least one additional vehicle, the contour line running along an outer side of the at least one additional vehicle; and
   calculating the at least one articulation angle between the vehicle having the at least one radar sensor and the at least one additional vehicle of the vehicle combination, the articulation angle being calculated by calculating an angle between the contour line and an axis of the vehicle;
   wherein a vehicle combination model that best describes the vehicle combination is selected from a multiplicity of vehicle combination models based on a comparison of articulation angles estimated for the vehicle combination models with the calculated at least one articulation angle; and
   wherein the estimated articulation angle of the selected combination model is used to correct the calculated at least one articulation angle.

2. The method as recited in claim 1, wherein the calculation of the at least one item of position information includes determining an item of micro-Doppler information based on the ascertained radar data, a position and/or number of wheels of the at least one additional vehicle being ascertained based on the micro-Doppler information.

3. The method as recited in claim 1, wherein an assignment of the ascertained radar data to the at least one additional vehicle of the vehicle combination is carried out using the at least one estimated articulation angle.

4. The method as recited in claim 1, wherein the at least one estimated articulation angle is determined using at least one item of driving information of the vehicle on which the radar sensor is situated.

5. The method as recited in claim 1, wherein the multiplicity of vehicle combination models differing from one another in terms of dimensions of vehicles modeled by each of the vehicle combination models and/or in terms of a number of axes of the vehicles modeled by each of the vehicle combination models.

6. The method as recited in claim 1, wherein at least one of the following is further calculated based on the calculated item of position information:
   an axial position of at least one axis of the at least one additional vehicle of the vehicle combination,
   a length of the at least one additional vehicle of the vehicle combination, and/or
   a type of the at least one additional vehicle of the vehicle combination.

7. The method as recited in claim 6, wherein the type of the at least one additional vehicle of the vehicle combination is calculated based on the axial position and/or the length of the at least one additional vehicle of the vehicle combination.

8. The method as recited in claim 1, wherein the at least one radar sensor is situated on a towing vehicle of the vehicle combination.

9. A device for determining at least one articulation angle of a vehicle combination, comprising:
   an interface configured to receive radar data that are ascertained by at least one radar sensor situated on a vehicle of the vehicle combination; and
   a computing device configured to perform the following:
      calculating at least one item of position information that relates to a vehicle position of at least one additional vehicle of the vehicle combination based on the ascertained radar data, the at least one item of position information including a contour line of the at least one additional vehicle, the contour line running along an outer side of the at least one additional vehicle, and calculating the at least one articulation angle between the vehicle having the at least one radar sensor and the at least one additional vehicle of the vehicle combination, the articulation angle calculated by calculating an angle between the contour line and an axis of the vehicle;

wherein a vehicle combination model that best describes the vehicle combination is selected from a multiplicity of vehicle combination models based on a comparison of articulation angles estimated for the vehicle combination models with the calculated at least one articulation angle; and wherein the estimated articulation angle of the selected combination model is used to correct the calculated at least one articulation angle.

* * * * *